No. 618,808. Patented Jan. 31, 1899.
W. STOFFEL.
PNEUMATIC TIRE PROTECTOR.
(Application filed May 28, 1898.)

(No Model.)

Witnesses
J. C. Shaw
Chas. T. Brock

Inventor
William Stoffel,
by O. M. ardsley
Attorneys

UNITED STATES PATENT OFFICE.

WILLIAM STOFFEL, OF McHENRY, ILLINOIS, ASSIGNOR OF ONE-FOURTH TO NICKOLAUS A. HEMAN, OF SAME PLACE.

PNEUMATIC-TIRE PROTECTOR.

SPECIFICATION forming part of Letters Patent No. 618,808, dated January 31, 1899.

Application filed May 28, 1898. Serial No. 682,042. (No model.)

*To all whom it may concern:*

Be it known that I, WILLIAM STOFFEL, a citizen of the United States, residing at McHenry, in the county of McHenry and State of Illinois, have invented a new and useful Pneumatic-Tire Protector, of which the following is a specification.

My invention relates to pneumatic tires for bicycles and other vehicles, and has for its object to provide means for minimizing the liability of puncture, such means being readily attachable and detachable and serving to assist in temporarily repairing punctures.

With this object in view my invention consists in a protector formed of an endless strip or belt of canvas, rubber, or other strong flexible material of one or more thicknesses to be cemented upon the outside of the tire while deflated.

My invention further consists in the improved construction, arrangement, and combination of parts hereinafter fully described and afterward particularly pointed out in the claim.

In order to enable others skilled in the art to which my invention most nearly appertains to make and use the same, I will now proceed to describe its construction and operation, having reference to the accompanying drawings, forming part hereof, in which—

Figure 1:
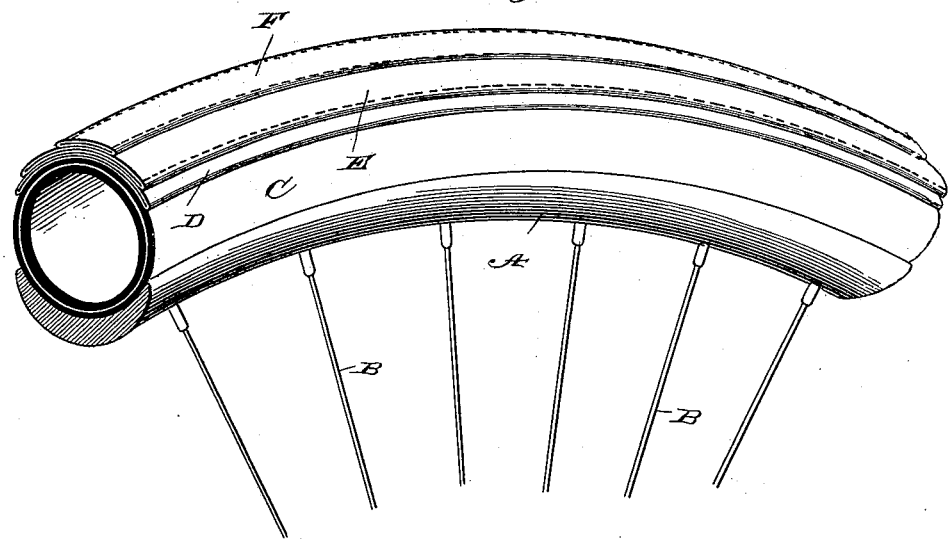
Figure 2:
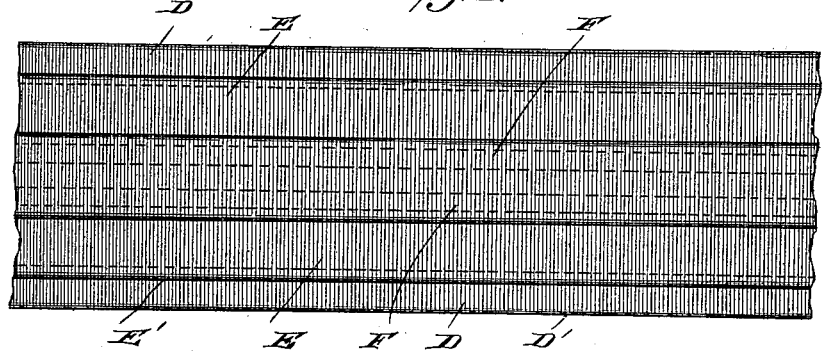
Figure 3:
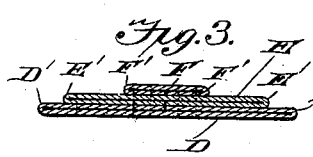
Figure 4:
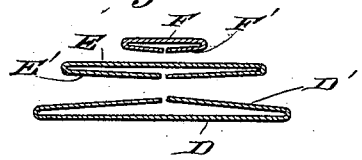
Figure 5:
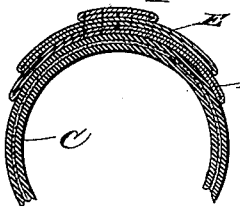

Figure 1 is a perspective sectional view of a section of a wheel with pneumatic tire equipped with a protector constructed in accordance with my invention. Fig. 2 is an outside view of a protector constructed in accordance with my invention. Fig. 3 is a transverse sectional view of the same. Fig. 4 is a transverse sectional view of the parts of the protector separated from each other, but in their proper relative positions. Fig. 5 is a transverse sectional view illustrating the protector secured to the tire.

Like letters of reference indicate the same parts in all the figures of the drawings.

Referring to the drawings by letters, A indicates the rim of a wheel such as is used on bicycles and like vehicles, B the spokes, and C the pneumatic tire, illustrated as a double-tube tire, although my invention is equally applicable to single-tube tires.

My improved protector is composed of an endless band of canvas, rubber, or other suitable strong but flexible material, and it may comprise as many layers as desired, although for general purposes it will probably be composed of three doubled layers D, E, and F, as illustrated, each layer being made of a belt or endless strip of twice the width it is to be when finished, formed by folding each edge over to the center, as at D', E', and F', and cementing them to the main body. I also prefer to make the strips of gradually-decreasing width from the inner one outward in order to oppose the greatest thickness to that part of the tire (the central line) where it bears with greatest pressure against the earth. These strips D, E, and F of graduated widths are cemented, sewed, or otherwise secured together and built up, as best illustrated in Fig. 3, and the pile thus formed is cemented to the tire while deflated or emptied of air, so that when the tire is inflated the protector will the more tightly hug it.

In use the center line of the tire is protected by the whole thickness, those portions of the tread of the tire next on each side by a decreased thickness, and the outer portions of the tread by the single layer D, these parts of the tire in the order named being exposed to gradually-decreasing liability to puncture.

While the special purpose served by my protector is to decrease the liability to puncture, it will also greatly assist in repairing punctures, at least temporarily, it being only necessary for this purpose to raise the protector off the puncture, slip in a piece of leather, rubber, or like patch, and allow the protector to fall back into position thereon, when it will secure the patch and mend the puncture.

While I have illustrated and described my protector as applied to the tire by cementing, I desire it to be understood that it may be secured by tape passed around it and the tire and rim, and I further wish it to be understood that other minor changes from the constructions described might be made without departing from the spirit or scope of my invention.

Having thus described my invention, what

I claim as new, and desire to secure by Letters Patent of the United States, is—

The pneumatic-tire protector herein described consisting of the endless belt composed of the layers D, E, F, of gradually-decreasing width and each formed by folding the edges D', E', and F' over to the center of the main body of the layer, the whole being rigidly secured together substantially as described.

WILLIAM STOFFEL.

Witnesses:
L. H. OWEN,
O. N. OWEN.